Nov. 8, 1938.   A. M. DIEZ   2,136,286
HEADLIGHT STRUCTURE
Filed Jan. 27, 1938
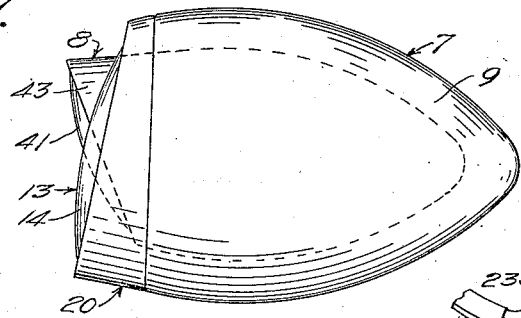
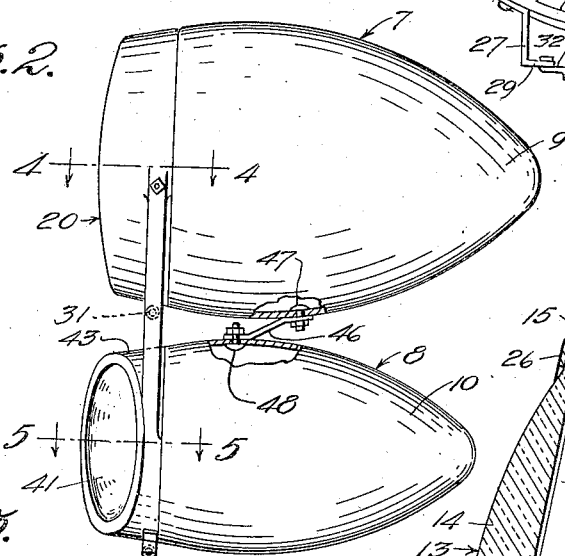
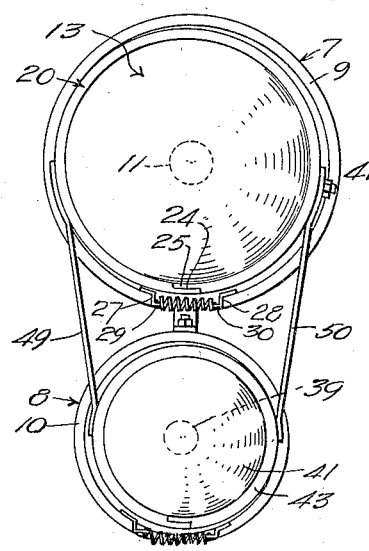
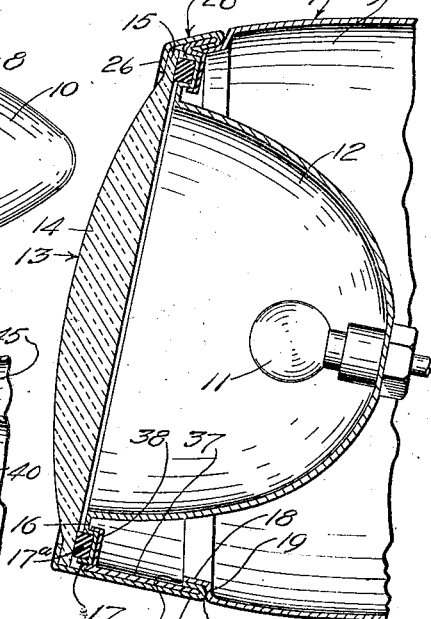
Inventor
ANGEL M. DIEZ,
By Kimmel & Crowell
Attorneys.

Patented Nov. 8, 1938

2,136,286

UNITED STATES PATENT OFFICE 2,136,286

HEADLIGHT STRUCTURE

Angel M. Diez, Mexico, D. F., Mexico

Application January 27, 1938, Serial No. 187,302
In Mexico December 15, 1937

4 Claims. (Cl. 240—7.1)

This invention relates to a headlight structure for use in connection with automotive vehicles.

The object of the invention is to provide, in a manner as hereinafter set forth, a structure of the class referred to for satisfactorily illuminating a road in front of a vehicle when the latter is travelling forwardly, and at the same time eliminating glare on the driver of an oncoming vehicle without the need of extra appliances or the constant attention of a driver to the structure, resulting in reducing the possibilities of accidents and collisions to a minimum.

A further object of the invention is to provide, in a manner as hereinafter set forth, a structure of the class referred to including a pair of sidewise opposed illuminating or lighting units, one disposed at a lateral inclination with respect to the other for illuminating the right half of the road, and the other disposed at lateral and downward inclinations with respect to the other for transversely illuminating the left side and left edge of the road.

A further object of the invention resides in the means for spacing and connecting the units together in sidewise opposed relation, the means for securing the reflector and lens of each unit in abutting relation and for coupling them to the casing of the unit, and the means for connecting the units together at their front ends.

A further object of the invention is to provide, in a manner as hereinafter set forth, a structure of the class referred to including a main illuminating or light unit disposed for illuminating the right side of the road, an auxiliary unit disposed to illuminate the left side and left edge of the road and with the main unit of greater size and capable of projecting a light beam of greater candle power and intensity than the auxiliary unit.

Embodying the objects as set forth and to others which may hereinafter appear, the invention consists of the novel construction, combination and arrangement of parts as will be more specifically described and illustrated in the accompanying drawing, wherein is shown an embodiment of the invention, but it is to be understood that changes, variations and modifications may be resorted to which fall within the scope of the invention as claimed.

In the drawing:

Figure 1 is a top plan of a headlight structure in accordance with this invention, Figure 2 is a side elevation thereof, Figure 3 is a front elevation, Figure 4 is a section on line 4—4, Figure 2 upon an enlarged scale, Figure 5 is a fragmentary section on line 5—5, Figure 2 upon an enlarged scale, and Figure 6 is a fragmentary view in front elevation.

The headlight structure includes main and auxiliary units 7, 8 respectively, for projecting light beams. The unit 7 is larger and projects a light beam of greater power and intensity than the unit 8. The units are termed illuminating units and are disposed in superposed spaced relation. Each unit includes a light source, a reflector and a lens. The light source, reflector and lens of the unit 7 are arranged at like inclinations laterally with respect to the axis of the unit and disposed horizontally in a direction for the purpose of illuminating the right side of the road. The light source, reflector and lens of unit 8 are arranged at like inclinations laterally with respect to the axis of the unit 7 and disposed horizontally in a direction for the purpose of illuminating the left side and left edge of the road. The lateral inclination of the unit 8 is greater than the lateral inclination of the light source, reflector and lens of the unit 7. The light source, reflector and lens of the unit 8 are downwardly inclined with respect to the axis of such unit.

The units 7, 8 include horizontally disposed casings 9, 10 respectively of substantially semi-elliptical contour, of the desired length and open at their fronts. The casing 9 is of greater length and diameter than the casing 10.

The unit 7 includes a light source 11, a parabolic reflector 12 and a lens 13. The light source 11 is arranged on the axis of the reflector 12 at the inner end of the latter. The reflector 12 is arranged within the front portion of and projects from the open front of casing 9. The lens 13 is of greater diameter than the diameter of and opposes the open front of the reflector 12. The lens 13 includes a body part 14 of segmental cross section which merges into a laterally extended annular flange 15. The reflector 12 at its front is formed with a laterally extended annular flange 16 which merges into a forwardly opening channel shaped ring 17 carrying a resilient annulus 17ª which bears against the inner face of the lens 13.

The casing 9 at its open front is formed with an inset circular part 18 forming an annular shoulder 19. Encompassing the part 18, seated against the shoulder 19 and extended forwardly from the latter and from the part 18 is a combined coupling and setting structure functioning to connect the unit 7 with and at an outward lateral inclination with respect to the longitudinal median of the casing 9. The said structure consists of a split resilient coupling band 20 of substantially truncated conoidal contour tapered from the transverse median of its outer side to the transverse median of its inner side. The split ends of the band 20 are indicated at 21, 22 (Figure 6). The end 21 is reduced to form a shoulder 23 and a seat 24 on the inner edge of the band. The end 22 is formed with a tongue 25 which rides against the seat 24 and has its movement limited by the shoulder 23 which is disposed in the path of the outer end of the tongue. The band 20 at its front edge is formed with an inwardly extending integral split annular flange 26 having its free edge beveled. Fixedly secured to the outer face of band 20, adjacent the ends 21, 22 is a pair of outwardly extending oppositely disposed angle-shaped spaced brackets 27, 28 respectively, having at their outer ends inturned apertured flanges 29, 30 arranged in spaced inner endwise alignment. Interposed between the brackets 27, 28 is a coiled controlling spring 31 normally tending to draw the split ends of the band towards each other. The ends 32, 33 of spring 31 are extended in opposite directions. The spring end 32 is connected to the flange 29 and the other end 33 of the spring is connected to the flange 30. The band 20 at its rear is formed with an inturned part 34 which bears against the part 18 of casing 9 and forms the band with an annular socket or groove 35 and an annular edge 36. The latter bears against shoulder 19.

Mounted in the socket or groove 35 is the rear portion of a resilient support 37 of a contour corresponding to the contour of the band 20. The support 37 at its outer end is formed with an inwardly extending channel-shaped flange 38 for receiving and supporting the ring 17 on reflector 12 and for coupling the latter with casing 9.

When the band 20 is assembled with respect to the other elements of the unit 7, the flange 26 overlaps the flange 15 of and surrounds the body part 14 of the lens 13. The spring 31 clamps the band in encompassing relation with respect to the part 18 of casing 9. When unit 7 is set up, the light source 11, reflector 12 and lens 13 are inclined outwardly with respect to axis of the casing 9.

The unit 8 is of the same construction as the unit 7, but smaller. The elements of the unit 8 are of the same form as, but smaller than the elements of the unit 7. The elements, i. e., light source, reflector, lens, resilient annulus, clamping band and resilient support of unit 8 are indicated at 39, 40, 41, 42, 43 and 44 respectively. The inset part of casing 10 is indicated at 45. When unit 8 is set up, the light source 39, reflector 40 and lens 41 are inclined inwardly and downwardly with respect to the axis of the casing 10. The band 43 tapers from the transverse median of its inner side to the transverse median of its outer side and is oppositely disposed with respect to band 20.

The controlling springs for the bands 20, 43 are arranged at the bottoms of the bands and bridge the split ends of the latter.

The casings 9 and 10 are coupled together in spaced relation and for such purpose an angle-shaped combined spacing and coupling member 46 is interposed between the inner sides of said casings. One end of member 46 is anchored to casing 9, as at 47 and its other end is anchored to casing 10, as at 48.

The coupling bands 20, 43 are coupled together in spaced relation and for this purpose, a pair of oppositely inclined horizontally disposed straplike members 49, 50 are employed, end terminal portions thereof secured to the band 20 at diametrically opposite points thereof, and their other end terminal portions secured to the band 43 at diametrically opposite points thereof. The connections between the bands and the members 49, 50 may be as desired. The members 46, 49 and 50 act to prevent any possibility of the units being displaced from set position.

What I claim is:

1. In a headlight structure, a pair of open front horizontally extending superposed casings, each having an annular inset front terminal portion of uniform diameter and length, a pair of oppositely laterally inclined superposed combined illuminating, reflecting and projecting devices, the lower one of said devices being inclined downwardly, each of said devices mounted in and extended from the front of a casing and consisting of a parabolic reflector, a light source carried by the latter and a lens at the front of and extended laterally from the reflector, a pair of oppositely disposed superposed combined coupling and setting structures of substantially truncated conoidal contour secured upon and extended from said portions for coupling said devices to said portions and for coupling said devices with said casings, each of said structures bearing against a reflector and spaced from the inner face and overlapping the marginal part of the outer face of a lens, each of said structures being tapered from the transverse median of one side to the transverse median of its other side, the upper one of said structures fixedly maintaining that device, with which it is correlated at a lateral outward inclination with respect to the longitudinal median of the upper casing, the lower one of said structures fixedly maintaining the device, with which it is correlated at a lateral inward and at a downward inclination with respect to the longitudinal median of the lower casing, means for connecting said structures together, and means for connecting said casings together.

2. In a headlight structure, a pair of open front horizontally extending superposed casings, each having an annular inset front terminal portion of uniform diameter and length, a pair of oppositely laterally inclined superposed combined illuminating reflecting and projecting devices, the lower one of said devices being inclined downwardly, each of said devices mounted in and extended from the front of a casing and consisting of a parabolic reflector, a light source carried by the latter and a lens at the front of and extended laterally from the reflector, a pair of oppositely disposed superposed combined coupling and setting structures of substantially truncated conoidal contour secured upon and extended from said portions for coupling said devices to said portions and for coupling said devices with said casings, each of said structures bearing against a reflector and spaced from the inner face and overlapping the marginal part of the outer face of a lens, each of said structures being tapered from the transverse median of one side to the transverse median of its other side, the upper one of said structures fixedly maintaining that device, with which it is correlated at a lateral outward inclination with respect to the longitudinal median of the upper casing, the lower one of said structures fixedly maintaining the device, with which it is correlated at a lateral inward and at a downward inclination with respect to the longitudinal median of the lower casing, means for connecting said structures together, and means for connecting said casings together, the upper one of the said devices being so formed for projecting a light beam of greater candle power and intensity than the beam projected from the other one of said devices.

3. In a headlight structure, an upper and a lower horizontally disposed open front casing, each having an annular inset front terminal portion of uniform diameter and length, said casings arranged in superposed relation and being connected together intermediate their ends, the inset front terminal portion of the upper casing being of greater diameter than the diameter of the inset front terminal portion of the lower casing, a pair of superposed combined illuminating, reflecting and projecting devices, each being substantially mounted within a casing, extended outwardly from the inset portion of the latter and disposed throughout at a lateral inclination with respect to the longitudinal median of the casing, a pair of oppositely disposed superposed combined coupling and setting structures, each being of annular substantially truncated conoidal contour tapering from the transverse median of one side to the transverse median of its other side, one of said structures being secured upon and extended forwardly from the inset portion of the upper casing, abutting the rear face and overlapping the front face of the upper one of said devices for coupling the latter to the upper casing and for maintaining said upper device at a lateral outward inclination with respect to the longitudinal median of the upper casing, and the lower one of said structures being secured upon and extended forwardly from the inset portion of the lower casing, abutting the rear face and overlapping the front face of said lower devices for coupling the latter to the lower casing and for maintaining the lower device at a lateral inward inclination and at a downward inclination with respect to the longitudinal median of the lower casing.

4. In a headlight structure, a pair of open front horizontal disposed annular casings, the upper one of the casings having its open front of greater diameter than the open front of the lower one, each of said casings being formed with an inset front terminal portion of uniform diameter and length, a pair of superposed combined illuminating, reflecting and projecting devices, each mounted on and extending forwardly from the open front of a casing, a pair of oppositely disposed resilient split band elements encompassing and extending forwardly from said inset portions, a pair of elastic means each connecting the split ends of an element together for securing the latter upon an inset portion, each element being substantially of truncated conoidal contour tapering from the transverse median of one side to the transverse median of its other side, one of said elements being provided with spaced aligned inclined means for coupling the upper of said devices with and forwardly of the inset portion of the upper casing and at a lateral outward inclination with respect to the longitudinal median of the upper casing, the other of said elements being provided with spaced aligned inclined means for coupling the lower of said devices with and forwardly of the inset portion of the lower casing at a lateral inward inclination with respect to the longitudinal median of the lower casing, and the lower one of said elements having the width of opposed portions of the length thereof such for disposing the lower device at a downwardly inclination with respect to the longitudinal median of the lower casing.

ANGEL M. DIEZ.